(12) United States Patent
Kim et al.

(10) Patent No.: US 10,954,404 B2
(45) Date of Patent: Mar. 23, 2021

(54) INK COMPOSITION FOR 3D PRINTING SUPPORT AND 3D PRINTING MANUFACTURING METHOD USING THE SAME

(71) Applicant: LG Chem, Ltd., Seoul (KR)

(72) Inventors: Mi-Kyoung Kim, Daejeon (KR); Joon-Hyung Kim, Daejeon (KR); Sung-Eun Park, Daejeon (KR); Seung-A Back, Daejeon (KR)

(73) Assignee: LG Chem, Ltd.

( * ) Notice: Subject to any disclaimer, the term of this patent is extended or adjusted under 35 U.S.C. 154(b) by 160 days.

(21) Appl. No.: 15/745,736

(22) PCT Filed: Jul. 19, 2016

(86) PCT No.: PCT/KR2016/007863
§ 371 (c)(1),
(2) Date: Jan. 18, 2018

(87) PCT Pub. No.: WO2017/014538
PCT Pub. Date: Jan. 26, 2017

(65) Prior Publication Data
US 2018/0215937 A1    Aug. 2, 2018

(30) Foreign Application Priority Data

Jul. 20, 2015 (KR) .................. 10-2015-0102625

(51) Int. Cl.
| | | |
|---|---|---|
| *C09D 11/38* | (2014.01) | |
| *C09D 11/30* | (2014.01) | |
| *B33Y 70/00* | (2020.01) | |
| *C09D 11/101* | (2014.01) | |
| *C09D 11/106* | (2014.01) | |
| *C09D 11/107* | (2014.01) | |
| *B29C 64/40* | (2017.01) | |

(52) U.S. Cl.
CPC .............. *C09D 11/38* (2013.01); *B33Y 70/00* (2014.12); *C09D 11/101* (2013.01); *C09D 11/106* (2013.01); *C09D 11/107* (2013.01); *C09D 11/30* (2013.01); *B29C 64/40* (2017.08)

(58) Field of Classification Search
CPC ..... C09D 11/38; C09D 11/101; C09D 11/106; C09D 11/107; C09D 11/30; B29C 64/00
See application file for complete search history.

(56) References Cited

U.S. PATENT DOCUMENTS

| | | | |
|---|---|---|---|
| 2003/0107158 A1* | 6/2003 | Levy ...................... | B29O 67/24 264/494 |
| 2004/0175451 A1 | 9/2004 | Maekawa et al. | |
| 2005/0053798 A1 | 3/2005 | Maekawa et al. | |
| 2013/0222501 A1* | 8/2013 | Kamada ................. | C09D 11/30 347/102 |
| 2013/0234370 A1 | 9/2013 | Suzuki et al. | |
| 2014/0049746 A1* | 2/2014 | Liu ........................ | G02B 1/043 351/159.33 |
| 2014/0139597 A1* | 5/2014 | Hiraoka ................. | C09D 11/38 347/86 |
| 2014/0162033 A1 | 6/2014 | Giller | |

FOREIGN PATENT DOCUMENTS

| | | |
|---|---|---|
| AT | 412399 B | 2/2005 |
| CN | 103189187 A | 7/2013 |
| CN | 104141243 A | 11/2014 |
| EP | 2752469 A1 | 7/2014 |
| EP | 2974850 A1 | 1/2016 |
| EP | 3235630 A1 | 10/2017 |
| JP | 2004291625 A | 10/2004 |
| JP | 2005081563 A | 3/2005 |
| JP | 2006282689 A | 10/2006 |
| JP | 2008169302 A * | 7/2008 |
| JP | 2009120825 A | 6/2009 |
| JP | 2010521330 A | 6/2010 |
| JP | 2015010164 A | 1/2015 |
| JP | 2015078255 A * | 4/2015 |
| JP | 2015078255 A | 4/2015 |
| JP | 2015123684 A | 7/2015 |
| KR | 20130079539 A | 7/2013 |
| KR | 20130141561 A | 12/2013 |
| WO | 2010057839 A1 | 5/2010 |
| WO | 2015144761 A1 | 10/2015 |

OTHER PUBLICATIONS

Extended European Search Report and Written Opinion for EP Application No. 16828042.8, dated Jun. 28, 2018.
Search report from International Application No. PCT/KR2016/007863, dated Oct. 12, 2016.
Luo Shunzhong, editor, Nuclear Technology Applications, published by Harbin Engineering University Press, Jan. 31, 2015; p. 201, ISBN: 978-7-5661-0970-5.
Yang Tiejun, Industry Patent Analysis Report, vol. 18—Additive Production, Intellectual Property Press, May 31, 2014; p. 49, ISBN: 978-7-5130-2632-1.
Search Report from First Chinese Office Action for Application No. 201680040571.5 dated Apr. 9, 2020; 3 pages.

\* cited by examiner

*Primary Examiner* — Ling Siu Choi
*Assistant Examiner* — David L Miller
(74) *Attorney, Agent, or Firm* — Lerner, David, Littenberg, Krumholz & Mentlik, LLP

(57) ABSTRACT

The present invention relates to an ink composition for a 3D printing support, comprising an amine-containing monomer and a curing agent. According to the present invention, an ink composition for a 3D printing support, which retains an excellent jetting property, is well dissolved in water after being photo-cured to be easily removed, and has less curing contraction and excellent storage stability, can be provided.

6 Claims, No Drawings

INK COMPOSITION FOR 3D PRINTING SUPPORT AND 3D PRINTING MANUFACTURING METHOD USING THE SAME

CROSS-REFERENCE TO RELATED PATENT APPLICATIONS

The present application is a national phase entry under 35 U.S.C. § 371 of International Application No. PCT/KR2016/007863 filed Jul. 19, 2016, published in Korean, which claims priority from Korean Application No. 10-2015-0102625 filed Jul. 20, 2015, all of which are incorporated herein by reference.

The present invention relates to an ink composition for a 3D printing support. More specifically, it relates to an ink composition for a 3D printing support, which can be used to an inkjet-type 3D printer, has an excellent jetting property, and is well dissolved in water after being cured to be easily removed.

BACKGROUND ART

A 3D printer is a printer that imprints a specific stuff three-dimensionally, and it is a device that can create a real object in a three-dimensional space as printing a three-dimensional design on a paper. Like the principle of printing a 2D image on a paper by jetting an ink onto the surface of the paper after a digitalized file is transferred to an inkjet printer, a 2D printer only moves front to back (x-axis) and left to right (y-axis), but the 3D printer adds an up-and-down (z-axis) motion to this to make a three-dimensional article based on the imputted 3D design.

When making a sculpture by this 3D printer, the sculpture of a bridge shape or a shape of floating in the air needs a support material. The support material should have a good supporting function when forming the sculpture and also should be well removed later.

Thus, a support ink which can be used in an inkjet type 3D printer is required, but the existing support ink had a problem that it needs a complicated removal process such as removing the support part manually or removing the support part one by one through a water jet method. For example, Korean Patent Publication No. 2013-0141561 discloses a support material for supporting shape when manufacturing an inkjet photo-shaped article, but in this case, there are problems that it takes much time and effort to remove the support part, it is difficult to remove completely, and contraction of the support is happened.

Thus, in order to solve these problems, studies for an ink which can be photo-cured and also removed by a simple method such as shaking in water after being cured or sonication are needed.

DISCLOSURE

Technical Problem

The present invention has been made keeping in mind the above problems in the related art, and an object of the present invention is to provide an ink composition for a 3D printing support, which has an excellent jetting property, is well dissolved in water after being photo-cured to be easily removed, and has less curing contraction and excellent storage stability.

Technical Solution

The present invention provides an ink composition for a 3D printing support, comprising an amine-containing monomer and a curing agent.

Further, the present invention provides a manufacturing method for 3D printing characterized by using the ink composition for a 3D printing support.

Advantageous Effects

According to the ink composition for a support,

There are advantages that it is well dissolved in water after being photo-cured to be easily removed, and has an excellent dimensional stability due to improved curing contraction characteristic.

MODE FOR INVENTION

Hereinafter, the present invention will be described in detail.

The ink composition for a 3D printing support according to the present invention is characterized by comprising an amine-containing monomer and curing agent.

The ink composition for a 3D printing support according to the present invention, having the above composition, can provide an ink composition for a 3D printing support, which has an excellent jetting property, is well dissolved in water after being photo-cured to be easily removed, and has less curing contraction and excellent storage stability.

First, the ink composition for a 3D printing support according to the present invention comprises an amine-containing monomer. The ink composition for a 3D printing support of the present invention may have an excellent curing property and be dissolved in water after being cured by comprising the amine-containing monomer.

In the present invention, the amine-containing monomer may be anything used in the art without particular limitation, but preferably, it may be at least one compound of the following Formula 1 to Formula 6.

First, as the amine-containing monomer of the present invention, the compound of the following Formula 1 may be used.

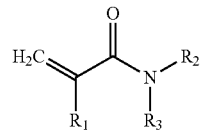

[Formula 1]

In the Formula 1, $R_1$ may be hydrogen or methyl, and $R_2$ and $R_3$ may be each independently hydrogen, $C_1$ to $C_{10}$ alkyl, vinyl, alkoxyl, cyclohexyl, phenyl, benzyl, alkylamine, alkyl ester or alkyl ether.

Further, preferably, in the Formula 1, $R_2$ and $R_3$ may be each independently hydrogen, methyl, ethyl, propyl, isopropyl, n-butyl, tert-butyl,

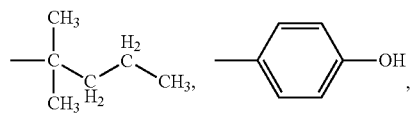

-continued

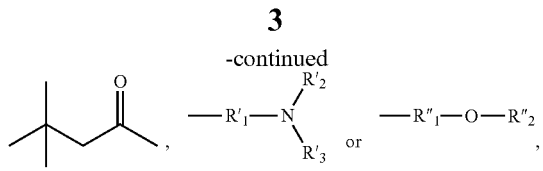

R'₁ may be CH₂, CH₂CH₂, CH₂CH₂CH₂, CH(CH₃)CH₂, CH₂CH₂CH₂CH₂, CH₂C(CH₃)₂ or C(CH₃)₂CH₂CH₂, R'₂ and R'₃ may be each independently hydrogen, CH₃, CH₂CH₃, CH₂CH₂CH₃, CH₂CH(CH₃)₂, CH₂C(CH₃)₃, CH(CH₃)₂, CH₂CH₂CH₂CH₃, C(CH₃)₂CH₂CH₃ or —CH=CH₂, R"₁ may be CH₂, CH₂CH₂, CH₂CH₂CH₂, CH(CH₂)CH₂, CH₂CH₂CH₂CH₂, CH₂C(CH₃)₂ or C(CH₃)₂CH₂CH₂, and R"₂ may be hydrogen, CH₃, CH₂CH₃, CH₂CH₂CH₃, CH₂CH(CH₃)₂, CH₂C(CH₃)₃, CH(CH₃)₂, CH₂CH₂CH₂CH₃, C(CH₃)₂CH₂CH₃ or —CH=CH₂.

Further, preferably, the Formula 1 may be the following Formula 1a.

[Formula 1a]

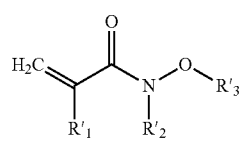

In the Formula 1a, R'₁ may be hydrogen or methyl, and R'₂ and R'₃ may be each independently hydrogen, methyl, ethyl, propyl, isopropyl, n-butyl, tert-butyl or —CH=CH₂.

Further, as the amine-containing monomer of the present invention, the compound of the following Formula 2 may be used.

[Formula 2]

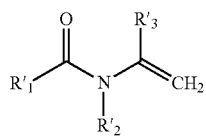

In the Formula 2, R'₁ and R'₂ may be each independently hydrogen, C₁ to C₁₀ alkyl, vinyl, alkoxyl, cyclohexyl, phenyl, benzyl, alkylamine, alkyl ester or alkyl ether, and R'₃ may be hydrogen or methyl.

Further, preferably, in the Formula 2, R'₁ and R'₂ may be each independently hydrogen, methyl, ethyl, propyl, isopropyl, n-butyl, tert-butyl,

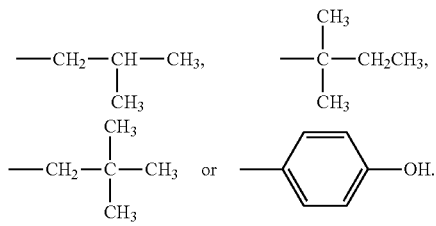

Further, as the amine-containing monomer of the present invention, the compound of the following Formula 3 may be used.

[Formula 3]

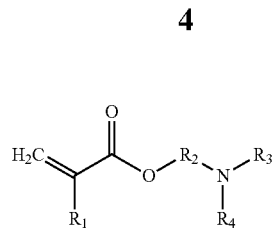

In the Formula 3, R₁ may be hydrogen or methyl, R₂ may be CH₂, CH₂CH₂, CH₂CH₂CH₂, CH(CH₂)CH₂, CH₂CH₂CH₂CH₂, CH₂C(CH₃)₂ or C(CH₃)₂CH₂CH₂, and R₃ and R₄ may be each independently hydrogen, methyl, ethyl, propyl, isopropyl, n-butyl, tert-butyl, —CH=CH₂ or —CH₂—CH=CH₂.

Further, as the amine-containing monomer of the present invention, the compound of the following Formula 4 may be used.

[Formula 4]

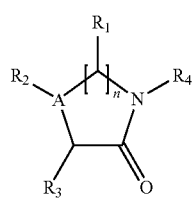

In the Formula 4, n may be an integer of 1 to 4, A may be C, O, N or S, R₁, R₂ and R₃ may be each independently hydrogen or C₁ to C₁₀ alkyl, and R₄ may be —CH=CH₂,

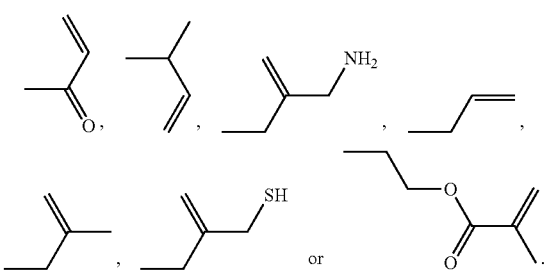

Further, preferably, the Formula 4 may be

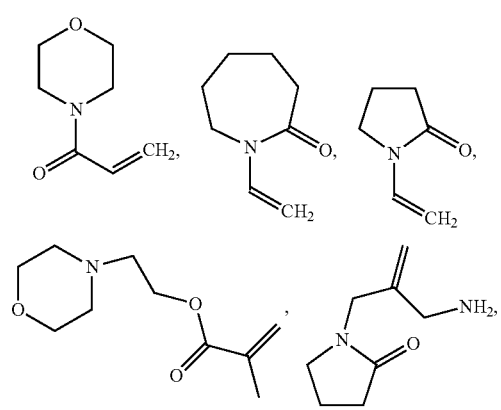

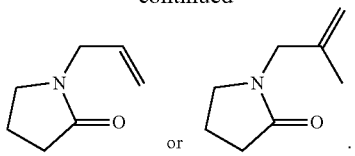

Further, as the amine-containing monomer of the present invention, the compound of the following Formula 5, Formula 6 or Formula 7 may be used.

[Formula 5]

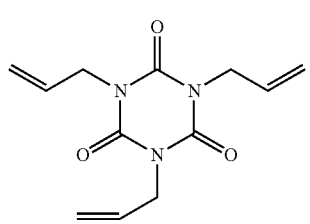

[Formula 6]

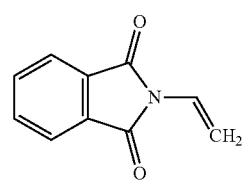

[Formula 7]

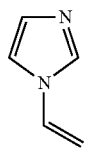

The amine-containing monomer may be contained in an amount of 10 to 99.9 wt % based on the total weight of the ink composition of the present invention. If the amount of the amine-containing monomer is less than 10 wt %, water solubility may be insufficient when removing a support, and if the amount thereof is more than 99.9 wt %, a curing characteristic may be worsen.

The ink composition for a 3D printing support according to the present invention comprises a curing agent. The ink composition for a 3D printing support of the present invention may be used in a curing process through various curing methods by comprising the curing agent.

In the present invention, as the curing agent, various curing agents used in the art may be used depending on curing methods, without particular limitation. As a specific example of the curing agent, a photo-initiator may be used. The photo-initiator may be anything used in the art in accordance with a light source in use, without particular limitation. Preferably, it may be a commercial item, for example, Irgacure 819 (bis acryl phosphine-based), Darocur TPO (mono acryl phosphine-based), Irgacure 369 (α-aminoketone-based), Irgacure 184 (α-hydroxyketone-based), Irgacure 907 (α-aminoketone-based), Irgacure 2022 (Bis acryl phosphine/α-hydroxyketone-based), Irgacure 2100 (Phosphine oxide-based), Darocur ITX (isopropyl thioxanthone) or a photo-initiator having similar structure thereto.

In the present invention, the curing agent may be contained in an amount of 0.01 to 20 wt % based on the total weight of the ink composition of the present invention, and preferably, it may be contained in an amount of 1 to 10 wt %. If the amount of the curing agent is less than 0.01 wt %, curing may not be happened, and if the amount thereof is more than 20 wt %, a head may be blocked because curing sensitivity is too much increased.

The ink composition for a 3D printing support according to the present invention may further comprise a monomer containing at least one of a vinyl group and an acrylate group. The ink composition for a 3D printing support of the present invention may have characteristics that it can control curing sensitivity and membrane properties such as strength of a cured product (softness or hardness), by comprising the monomer containing at least one of a vinyl group and an acrylate group.

In the present invention, the monomer containing at least one of a vinyl group and an acrylate group may be anything used in the art, without particular limitation. Preferably, it may be at least one selected from the group consisting of vinyl acetate, 2-hydroxyethyl(meth)acrylate, 2-hydroxymethyl(meth)acrylate, 2-hydroxypropyl(meth)acrylate, 4-hydroxybutyl(meth)acrylate, ethyl-2-hydroxyacrylate, 2-(acryloyloxy)ethyl hydrogen succinate and methacylic acid.

In the present invention, the monomer containing at least one of a vinyl group and an acrylate group may be contained in an amount of 0.1 to 80 wt % based on the total weight of the ink composition of the present invention. If the amount of the monomer containing at least one of a vinyl group and an acrylate group is less than 0.1 wt %, it may be difficult to obtain sufficient effect according to addition of the monomer, and if the amount thereof is more than 80 wt %, a cured product may not be dissolved in water.

The ink composition for a 3D printing support according to the present invention may further comprise a water soluble polymer. The ink composition for a 3D printing support of the present invention may have characteristics that it can control viscosity of the ink, and it allows the cured product to be easily dissolved in water, by comprising the water soluble polymer.

In the present invention, the water soluble polymer may be anything used in the art, without particular limitation. Preferably, it may be at least one selected from the group consisting of the compounds of the following Formula 8a to Formula 8e.

[Formula 8a]

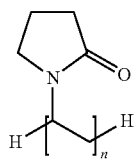

[Formula 8b]

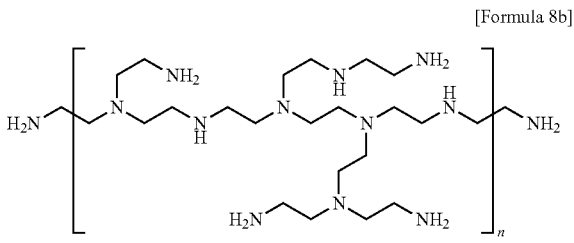

[Formula 8c]

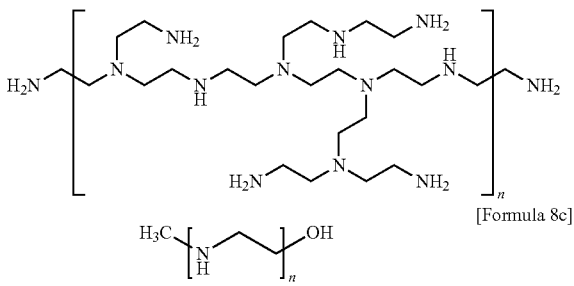

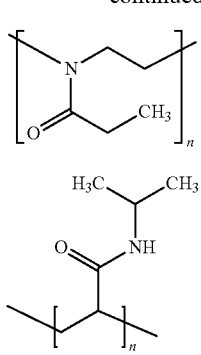

[Formula 8d]

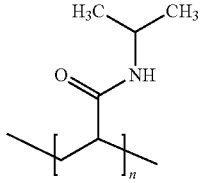

[Formula 8e]

(In Formulae 8a to 8e, n is 50 to 25,000.)

In the present invention, the water soluble polymer may be contained in an amount of 0.1 to 30 wt % based on the total weight of the ink composition of the present invention. If the amount of the water soluble polymer is less than 0.1 wt %, effect on solubility increase according to addition of the polymer may be minor, and if the amount thereof is more than 30 wt %, jetting may be impossible due to increased viscosity of the ink.

The ink composition for a 3D printing support according to the present invention may further comprise a vinyl ether compound. The ink composition for a 3D printing support of the present invention may prevent contraction of the cured product of the composition, by comprising the vinyl ether compound.

In the present invention, the vinyl ether compound is not particularly limited, and it may preferably be 4-hydroxybutyl vinyl ether (HBVE), ethyl vinyl ether, butyl vinyl ether, cyclohexyl vinyl ether, 2-ethylhexyl vinyl ether, dodecyl vinyl ether, diethylene glycol divinyl ether, 1,4-cyclohexane dimethanol divinyl ether, triethylene glycol divinyl ether, 1,4-butanediol divinyl ether and the like.

In the present invention, the vinyl ether compound may be contained in an amount of 0.1 to 50 wt % based on the total weight of the ink composition of the present invention. If the amount of the vinyl ether compound is less than 0.1 wt %, improvement of contraction while curing may be little, and if the amount there of is more than 50 wt %, hardness and strength of the membrane while curing may become weak, and curing sensitivity may be reduced.

The ink composition for a 3D printing support according to the present invention may further comprise additives in addition to the above composition. The additives contained in the composition may be a surfactant, a plasticizer, a polymerization inhibitor, an antifoaming agent, a diluent, a thermal stabilizer, a viscosity controlling agent and the like.

The additives may be contained in the least amount that it can induce the above effects in terms of economics, and preferably contained in an amount of 0.1 to 5 wt % based on the whole ink composition.

Further, the present invention provides a support manufactured with the ink composition for a 3D printing support mentioned above.

The support may be anything used in a 3D printing process without particular limitation.

Further, the present invention provides a manufacturing method for 3D printing characterized by using the ink composition for a 3D printing support mentioned above.

The manufacturing method may be any manufacturing method related to a 3D printing process, without particular limitation.

BEST MODE CARRYING OUT THE INVENTION

The present invention will be explained in detail with reference to the following examples, including test examples. However, these examples are provided for illustrative purposes only and are not intended to limit the scope of the invention.

EXAMPLE

1. Preparation of Ink Composition

As shown in the following Table 1, a monomer containing at least one of an amine-containing monomer, a vinyl group and an acrylate group (V/A monomer), a curing agent, a water soluble polymer, a vinyl ether compound and the like were mixed to prepare ink compositions of Examples 1 to 26.

TABLE 1

|  | Amine-containing monomer | Curing agent | V/A monomer | Water soluble polymer | Vinyl ether compound |
|---|---|---|---|---|---|
| Example 1 | DMA (96.6 wt %) | I 819 (3.4 wt %) | — | — | — |
| Example 2 | DMA + DAA (64.4 + 32.2 wt %) | TPO (3.4 wt %) | | | |
| Example 3 | DMA + DMAPMA (64.4 + 32.2 wt %) | I 819 (3.4 wt %) | | | |
| Example 4 | DMA + NMNVA (64.4 + 32.2 wt %) | I 819 (3.4 wt %) | | | |
| Example 5 | DMA + DMAEA (64.4 + 32.2 wt %) | I 819 (3.4 wt %) | | | |
| Example 6 | DMA + VP (48.3 + 48.3 wt %) | I 819 (3.4 wt %) | | | |
| Example 7 | ACMO + VP (48.3 + 48.3 wt %) | I 819 (3.4 wt %) | | | |
| Example 8 | NIPA + VP (48.3 + 48.3 wt %) | I 819 (3.4 wt %) | | | |
| Example 9 | DMA + VP (38.25 + 38.25 wt %) | I 819 (3.5 wt %) | VA (20 wt %) | — | |
| Example 10 | DMA + VP (43.25 + 43.25 wt %) | I 819 (3.5 wt %) | HEA (10 wt %) | | |

TABLE 1-continued

| | Amine-containing monomer | Curing agent | V/A monomer | Water soluble polymer | Vinyl ether compound |
|---|---|---|---|---|---|
| Example 11 | DMA (86.5 wt %) | I 819 (3.5 wt %) | HEA (10 wt %) | | |
| Example 12 | DMA + VP (45 + 36.5 wt %) | I 819 (3.5 wt %) | HBA (15 wt %) | | |
| Example 13 | DMA (46.5 wt %) | I 819 (3.5 wt %) | HEMA (50 wt %) | | |
| Example 14 | DMA + VP (59.0 + 29.5 wt %) | I 819 (3.5 wt %) | MA (8 wt %) | | |
| Example 15 | DMA (43.0 wt %) | I 819 (3.5 wt %) | HEMA (41.5 wt %) | PVP (0.5 wt %) | — |
| Example 16 | DMA + VP (48.0 + 48.0 wt %) | I 819 (3.5 wt %) | | PAA (0.5 wt %) | |
| Example 17 | HDMA + VP (43.75 + 43.75 wt %) | I 819 (3.5 wt %) | | PEI (9 wt %) | |
| Example 18 | DMA + VP (45.75 + 35.75 wt %) | I 819 (3.5 wt %) | HEMA (10 wt %) | PEI (5 wt %) | |
| Example 19 | DMA + VP (60.25 + 25.75 wt %) | I 819 (3.5 wt %) | HEMA (10 wt %) | PAA (0.5 wt %) | |
| Example 20 | DMA + DAAM + VP (31.0 + 10.0 + 21.0 wt %) | I 819 (4.0 wt %) | — | PVP (14 wt %) | HBVE (20 wt %) |
| Example 21 | DMA + VP (46 + 32.5 wt %) | I 819 (3.5 wt %) | | | HBVE (18 wt %) |
| Example 22 | DMA + VP (46 + 12.5 wt %) | I 819 (3.5 wt %) | HEMA (20 wt %) | | HBVE (18 wt %) |
| Example 23 | DMA + VP (38 + 38 wt %) | I 819 (3.5 wt %) | | PVP (0.5 wt %) | IBVE (20 wt %) |
| Example 24 | DMA + VP (46 + 32.5 wt %) | I 819 (3.5 wt %) | | | IBVE (18 wt %) |
| Example 25 | DMA + VP (46 + 12.5 wt %) | I 819 (3.5 wt %) | HEMA (20 wt %) | | IBVE (18 wt %) |
| Example 26 | DMA + VP (41 + 21 wt %) | I 819 (3.5 wt %) | HEMA (4 wt %) | PVP (10 wt %) | HBVE (20 wt %) |

DMA: N,N-dimethylacrylamide
DAA: Diacetone acrylamide
DMAPMA: N-[3-(dimethylamino)propyl]methacrylamide
NMNVA: N-methyl-N-vinylacetamide
*DMAEA: 2-(dimethylamino)ethyl acrylate
VP: N-vinyl pyrrolidone
ACMO: 4-acryloylmorpholine
NIPA: N-isopropylacrylamide
VA: Vinyl acetate
HEA: 2-hydroxyethyl acrylate
HEMA: 2-hydroxyethyl methacrylate
HBA: 4-hydroxybutylacrylate
MA: Methacrylic acid
PVP: Polyvinylpyrrolidone
PEI: Polyethyleneimine
PAA: Polyacrylic acid
HBVE: 4-hydroxybutylvinyl ether
IBVE: Isobutylvinyl ether Further, ink compositions of Comparative Examples 1 to 7 were prepared as follows.

TABLE 2

| | A | B | C | D |
|---|---|---|---|---|
| Comparative Example 1 | BA (48.25 wt %) | I 819 (3.5 wt %) | DPGDA (48.25 wt %) | — |
| Comparative Example 2 | TMPTA (48.25 wt %) | I 819 (3.5 wt %) | DPGDA (48.25 wt %) | |
| Comparative Example 3 | EA (76.5 wt %) | I 819 (3.5 wt %) | GDGDA (20 wt %) | |
| Comparative Example 4 | TMPTA (48.25 wt %) | I 819 (3.5 wt %) | HEMA (48.25 wt %) | |
| Comparative Example 5 | DPGDA (48.25 wt %) | I 819 (3.5 wt %) | HEA (48.25 wt %) | |
| Comparative Example 6 | — | I 819 (3.5 wt %) | HEMA (88.5 wt %) | PVP (8.0 wt %) |
| Comparative Example 7 | IBOA (86.5 wt %) | I 819 (3.5 wt %) | GDGDA (10 wt %) | |

BA: Butyl acrylate
DPGDA: Dipropylene Glycol Diacrylate
TMPTA: Trimethylolpropane triacrylate
EA: Ethyl acrylate
IBOA: Isobornyl acrylate
GDGDA: Glycerol 1,3-diglycerolate diacrylate Test Example Supports were prepared using the ink compositions prepared in Examples 1 to 25 and Comparative Examples 1 to 7. Specifically, 4 to 5 drops of the ink composition was dropped on a substrate and then exposed to a high pressure mercury lamp at 1000 mJ/cm$^2$ to prepare a support. Then, hardness, solubility in water and improvement of curing contraction were evaluated as follows.

Test Example 1. Evaluation of Hardness

The ink composition was spin coated on a glass and exposed to a LED lamp of wavelength of 365 nm. Whether the composition was cured or not was observed with eyes while controlling exposure amount to 120 to 1000 mJ/cm$^2$ and then curing sensitivity was decided. If the composition was cured successfully, it was decided as o, and if the composition was cured unsuccessfully, it was decided as x. The results are shown in Table 3.

Test Example 2. Evaluation of Solubility in Water

The ink composition was dropped on a film substrate using a spuit, and then exposed to a high pressure mercury lamp at 1000 mJ/cm$^2$. Multiple layers were repeatedly formed to make a support ink cured product sample, and the sample was peeled off from the substrate and immersed in water. A bottle where the ink cured product was immersed was put in a sonicator and sonicated for 60 mins. Then, whether the cured product sample was dissolved or not was confirmed to evaluate solubility.

If the sample was dissolved well in water, it was decided as o, if the sample was dissolved little, it was decided as Δ, and if the sample was not dissolved in water, it was decided as x. The results are shown in Table 3.

Test Example 3. Evaluation of Curing Contraction Improvement

The ink composition was dropped on a film substrate using a spuit, and then exposed to light for curing. Then whether the film was bent or not was observed. If the film was bent sharply, it was decided that curing contraction was happened, and if original shape of the film was kept, it was decide that there was no curing contraction.

If there was no curing contraction, it was decided as o, if there was small curing contraction, it was decided as Δ, if there was large curing contraction, it was decided as x, and if the was sample was not dissolved in water, it was decided as—because improvement of curing contraction was not measured. The results are shown in Table 3.

TABLE 3

|  | Hardness | Solubility in water | Improvement of curing contraction |
| --- | --- | --- | --- |
| Example 1 | o | o | x |
| Example 2 | o | o | x |
| Example 3 | o | o | Δ |
| Example 4 | o | o | Δ |
| Example 5 | o | o | x |
| Example 6 | o | o | x |
| Example 7 | o | o | x |
| Example 8 | o | o | x |
| Example 9 | o | o | x |
| Example 10 | o | o | x |
| Example 11 | o | o | x |
| Example 12 | o | o | x |
| Example 13 | o | o | x |
| Example 14 | o | o | x |
| Example 15 | o | o | x |
| Example 16 | o | o | x |
| Example 17 | o | o | o |
| Example 18 | o | o | o |
| Example 19 | o | o | x |
| Example 20 | o | o | o |

TABLE 3-continued

|  | Hardness | Solubility in water | Improvement of curing contraction |
| --- | --- | --- | --- |
| Example 21 | o | o | o |
| Example 22 | o | o | o |
| Example 23 | o | o | o |
| Example 24 | o | o | o |
| Example 25 | o | o | o |
| Example 26 | o | o | o |
| Comparative Example 1 | o | x | — |
| Comparative Example 2 | o | x | — |
| Comparative Example 3 | o | x | — |
| Comparative Example 4 | o | x | — |
| Comparative Example 5 | o | x | — |
| Comparative Example 6 | o | x | — |
| Comparative Example 7 | o | x | — |

As shown in Table 2 of Test Example, the ink compositions of Example 1 to Example 26 had excellent hardness and solubility in water. In particular it can be found that the compositions of Example 17, Example 18, and Example 20 to Example 26 are excellent in terms of curing contraction. Herein, the term "soluble" means all states that, when the cured product is immersed in water and then shaken or sonicated, lumps of the cured product are dissolved in water, the cured product is dispersed in water, or the cured product is floated in water in the shape of fine powder. Thus, the ink compositions of Example 1 to Example 26 were evaluated that it is very sufficient for the ink composition for a support used in a 3D printing process.

In comparison, the compositions of Comparative Example 1 to Comparative Example 7 not containing the amine-containing monomer was hardly removed later when it was used as a support ink because the cured product was not dissolved in water. Thus, the ink compositions of Comparative Example 1 to Comparative Example 7 was evaluated that it is insufficient for the ink composition for a support used in a 3D printing process.

The invention claimed is:

1. An ink composition for a 3D printing support, the ink composition comprising an amine-containing monomer, a photoinitiator, a water soluble polymer, a vinyl ether compound, and a monomer containing at least one of a vinyl group and an acrylate group, wherein the amine-containing monomer is the compound of the following Formula 1:

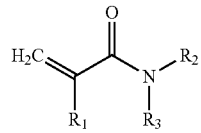

[Formula 1]

wherein $R_1$ is hydrogen or methyl, and $R_2$ and $R_3$ are each independently hydrogen, $C_1$ to $C_{10}$ alkyl, vinyl, alkoxyl, cyclohexyl, phenyl, benzyl, alkylamine, alkyl ester, alkyl ether,

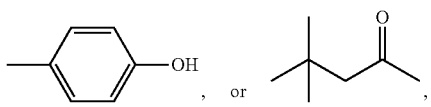, or wherein the water soluble polymer is at least one of the compounds of the following Formula 8a to Formula 8d:

[Formula 8a]

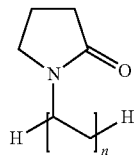

[Formula 8b]

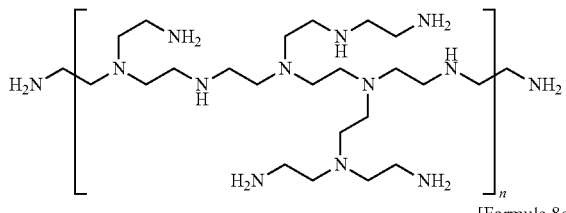

[Formula 8c]

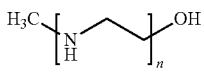

[Formula 8d]

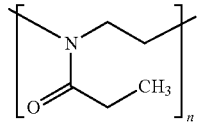

wherein n is 50 to 25,000,
and the water soluble polymer is included in an amount of 0.1 to 30 wt % based on the total weight of the ink composition, and
wherein the vinyl ether compound is selected from 4-hydroxybutyl vinyl ether, ethyl vinyl ether, butyl vinyl ether, cyclohexyl vinyl ether, 2-ethylhexyl vinyl ether, dodecyl vinyl ether, diethylene glycol divinyl ether, 1,4-cyclohexane dimethanol divinyl ether, triethylene glycol divinyl ether or 1,4-butanediol divinyl ether,
wherein the ink composition when cured is dissolvable in water.

2. The ink composition for a 3D printing support according to claim 1, wherein the $C_1$ to $C_{10}$ alkyl is methyl, ethyl, propyl, isopropyl, n-butyl, tert-butyl, or

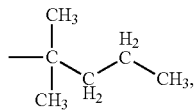

the alkylamine is

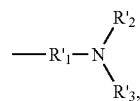

and the alkyl ether is $—R''_1—O—R''_2$, wherein $R'_1$ is $CH_2$, $CH_2CH_2$, $CH_2CH_2CH_2$, $CH_2CH_2CH_2CH_2$, $CH_2C(CH_3)_2$ or $C(CH_3)_2CH_2CH_2$, $R'_2$ and $R'_3$ are each independently hydrogen, $CH_3$, $CH_2CH_3$, $CH_2CH_2CH_3$, $CH_2CH(CH_3)_2$, $CH_2C(CH_3)_3$, $CH(CH_3)_2$, $CH_2CH_2CH_2CH_3$, $C(CH_3)_2CH_2CH_3$ or $—CH=CH_2$, $R''_1$ is $CH_2$, $CH_2CH_2$, $CH_2CH_2CH_2$, $CH(CH_2)CH_2$, $CH_2CH_2CH_2CH_2$, $CH_2C(CH_3)_2$ or $C(CH_3)_2CH_2CH_2$, and $R''_2$ is hydrogen, $CH_3$, $CH_2CH_3$, $CH_2CH_2CH_3$, $CH_2CH(CH_3)_2$, $CH_2C(CH_3)_3$, $CH(CH_3)_2$, $CH_2CH_2CH_2CH_3$, or $C(CH_3)_2CH_2CH_3$.

3. The ink composition for a 3D printing support according to claim 1, wherein the compound of Formula 1 is the compound of the following Formula 1a:

[Formula 1a]

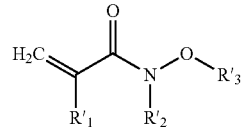

wherein $R'_1$ is hydrogen or methyl, and $R'_2$ and $R'_3$ are each independently methyl, ethyl, propyl, isopropyl, n-butyl, or tert-butyl.

4. The ink composition for a 3D printing support according to claim 1, wherein the monomer containing at least one of a vinyl group and an acrylate group is at least one selected from the group consisting of vinyl acetate, 2-hydroxyethyl (meth)acrylate, 2-hydroxymethyl(meth)acrylate, 2-hydroxypropyl(meth)acrylate, 4-hydroxybutyl(meth)acrylate, ethyl-2-hydroxyacrylate, 2-(acryloyloxy)ethyl hydrogen succinate and methacylic acid.

5. The ink composition for a 3D printing support according to claim 1, which further comprises an additive, which is at least one selected from the group consisting of a surfactant, a plasticizer, a polymerization inhibitor, an antifoaming agent, a diluent, a thermal stabilizer and a viscosity controlling agent.

6. A manufacturing method for 3D printing which uses the ink composition for a 3D printing support of claim 1.

* * * * *